(12) United States Patent
Wilkes et al.

(10) Patent No.: US 10,099,817 B2
(45) Date of Patent: Oct. 16, 2018

(54) FLEXIBLE CONTAINER AND PROCESS FOR PRODUCING SAME

(71) Applicant: Dow Global Technologies LLC, Midland, MI (US)

(72) Inventors: Kenneth R. Wilkes, Asheville, NC (US); Marlos G. Oliveira, Sao Paulo (BR); Marcos P. Franca, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 379 days.

(21) Appl. No.: 14/701,894

(22) Filed: May 1, 2015

(65) Prior Publication Data

US 2015/0314919 A1    Nov. 5, 2015

Related U.S. Application Data

(60) Provisional application No. 61/988,624, filed on May 5, 2014.

(51) Int. Cl.
*B32B 37/18* (2006.01)
*B65D 30/20* (2006.01)
(Continued)

(52) U.S. Cl.
CPC .............. *B65D 31/10* (2013.01); *B29C 65/18* (2013.01); *B29C 66/1122* (2013.01); *B29C 66/244* (2013.01); *B29C 66/346* (2013.01); *B29C 66/3462* (2013.01); *B29C 66/3472* (2013.01); *B29C 66/43* (2013.01); *B29C 66/81427* (2013.01); *B29C 66/851* (2013.01);
(Continued)

(58) Field of Classification Search
CPC ..... B31B 1/64; B31B 1/66; B31B 2219/6038; B65D 31/10; B65D 33/065
See application file for complete search history.

(56) References Cited

U.S. PATENT DOCUMENTS

| 2002/0011048 A1 | 1/2002 | Windomoeller et al. |
| 2011/0056965 A1 | 3/2011 | Peer et al. |

(Continued)

FOREIGN PATENT DOCUMENTS

| EP | 0899084 A1 | 3/1999 |
| JP | 10-157743 A | 6/1998 |

(Continued)

*Primary Examiner* — Scott W Dodds
(74) *Attorney, Agent, or Firm* — Husch Blackwell LLP

(57) ABSTRACT

A process for producing a flexible container is provided. The process includes:
A. providing a rear panel web, a front panel web, a first folded gusset panel web, and a second folded gusset panel web, each panel web having peripheral edges and a bottom face, each bottom face having two opposing tapered edges meeting at a bottom end;
B. placing the folded gusset panel webs between the rear panel web and the front panel web, the gusset panel webs opposing each other, the panel webs configured to form a common periphery and the bottom seal area including the bottom end of each panel;
C. first sealing the peripheral edges, the tapered edges, and the bottom seal area under a set of heat seal conditions;
D. second sealing a portion of the bottom seal area under a second heat seal condition; and
E. forming a flexible container.

20 Claims, 10 Drawing Sheets

(51) Int. Cl.
- *B32B 37/06* (2006.01)
- *B65D 33/06* (2006.01)
- *B29C 65/18* (2006.01)
- *B29C 65/00* (2006.01)
- *B65D 75/00* (2006.01)
- *B65D 75/28* (2006.01)
- *B65D 75/56* (2006.01)
- *B65D 75/58* (2006.01)
- *B29L 31/00* (2006.01)
- *B31B 150/00* (2017.01)
- *B31B 160/30* (2017.01)
- *B31B 70/00* (2017.01)
- *B31B 70/26* (2017.01)
- *B31B 70/64* (2017.01)
- *B31B 70/84* (2017.01)

(52) U.S. Cl.
CPC .. *B29C 66/91423* (2013.01); *B29C 66/92451* (2013.01); *B32B 37/06* (2013.01); *B32B 37/18* (2013.01); *B65D 33/065* (2013.01); *B65D 75/008* (2013.01); *B65D 75/28* (2013.01); *B65D 75/563* (2013.01); *B65D 75/5883* (2013.01); *B29C 66/71* (2013.01); *B29C 66/72321* (2013.01); *B29C 66/72341* (2013.01); *B29C 66/81429* (2013.01); *B29C 66/8416* (2013.01); *B29C 66/919* (2013.01); *B29L 2031/7128* (2013.01); *B31B 70/008* (2017.08); *B31B 70/266* (2017.08); *B31B 70/642* (2017.08); *B31B 70/844* (2017.08); *B31B 2150/00* (2017.08); *B31B 2150/002* (2017.08); *B31B 2160/30* (2017.08); *B32B 2307/546* (2013.01); *B32B 2439/00* (2013.01)

(56) References Cited

U.S. PATENT DOCUMENTS

| | | |
|---|---|---|
| 2011/0069908 A1 | 3/2011 | Wilkes et al. |
| 2013/0305664 A1* | 11/2013 | Arroyo Yillan ........ B29C 65/02 53/469 |

FOREIGN PATENT DOCUMENTS

| | | | |
|---|---|---|---|
| JP | 10-250747 A | | 9/1998 |
| JP | 10-287344 A | | 10/1998 |
| JP | 2002-154554 A | | 5/2002 |
| JP | 2003-146337 A | | 5/2003 |
| JP | 2004-033103 A | | 2/2004 |
| JP | 2011-001125 A | | 1/2011 |
| WO | WO2012/052445 | * | 4/2012 ............. B32B 27/12 |

* cited by examiner

FLEXIBLE CONTAINER AND PROCESS FOR PRODUCING SAME

BACKGROUND

The present disclosure is directed to a flexible container for dispensing a flowable material and a process for producing the flexible container.

Known are flexible containers with a gusseted body section. These gusseted flexible containers are currently produced using flexible films which are folded to form gussets and heat sealed in a perimeter shape. The gusseted body section opens to form a flexible container with a square cross section or a rectangular cross section. The gussets are terminated at the bottom of the container to form a substantially flat base, providing stability when the container is partially or wholly filled.

When a filled gusseted flexible container is dropped, burst or leakage may occur, resulting in lost product, waste, spill damage, and clean-up cost. Desired is a gusseted flexible container with improved drop strength, including improved side drop strength.

SUMMARY

The present disclosure provides a process for producing a flexible container.

In an embodiment, a process for producing a flexible container is provided and includes:

A. providing a rear panel web, a front panel web, a first folded gusset panel web, and a second folded gusset panel web, each panel web having peripheral edges and a bottom face, each bottom face having two opposing tapered edges meeting at a bottom end;

B. placing the folded gusset panel webs between the rear panel web and the front panel web, the gusset panel webs opposing each other, the panel webs configured to form a common periphery and the bottom seal area including the bottom end of each panel;

C. first sealing the peripheral edges, the tapered edges, and the bottom seal area under a first heat seal condition;

D. second sealing at least a portion of the bottom seal area under a second heat seal condition; and E. forming a flexible container.

DETAILED DESCRIPTION

The present disclosure provides a flexible container. The flexible container includes:

A. A front panel, a rear panel, a first gusseted side panel, and a second gusseted side panel, the gusseted side panels adjoining the front panel and the rear panel along peripheral seals to form a chamber.

B. Each panel includes a bottom segment comprising two opposing peripheral tapered seals, each peripheral tapered seal extending from a respective peripheral seal, each peripheral tapered seal comprising an inner edge, the peripheral tapered seals converging at a bottom seal area.

C. The front panel bottom segment includes a first line defined by the inner edge of the first peripheral tapered seal and a second line defined by the inner edge of the second peripheral tapered seal, the first line intersecting the second line at an apex point in the bottom seal area.

D. The front panel bottom segment has a bottom distalmost inner seal point on the inner edge.

E. The apex point is separated from the bottom distalmost inner seal point by a distance from 0 mm to less than 8.0 mm.

Figure 1:
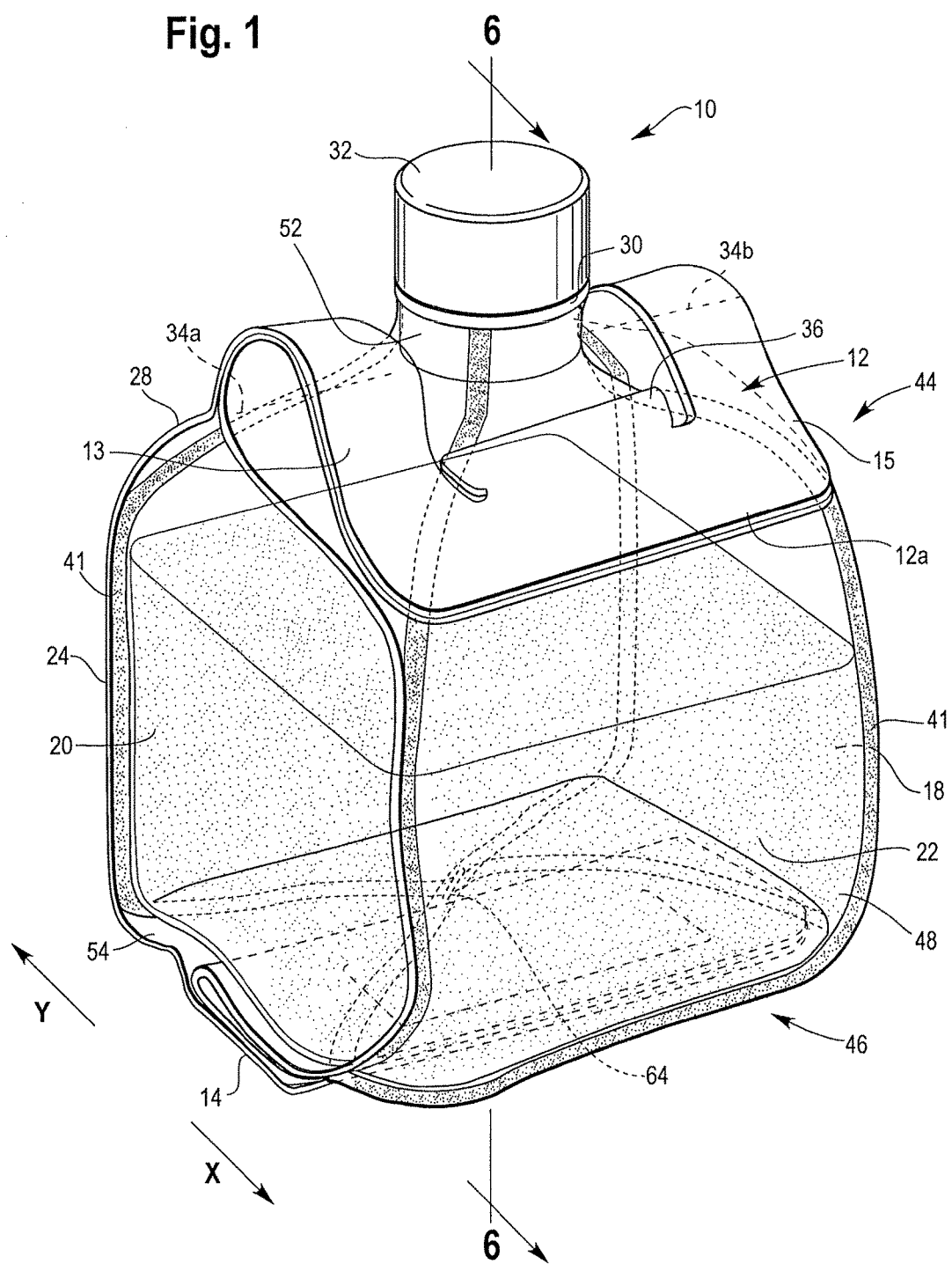
FIG. 1 is a perspective view of a filled flexible container having top and bottom flexible handles in a rest position.
Figure 2:
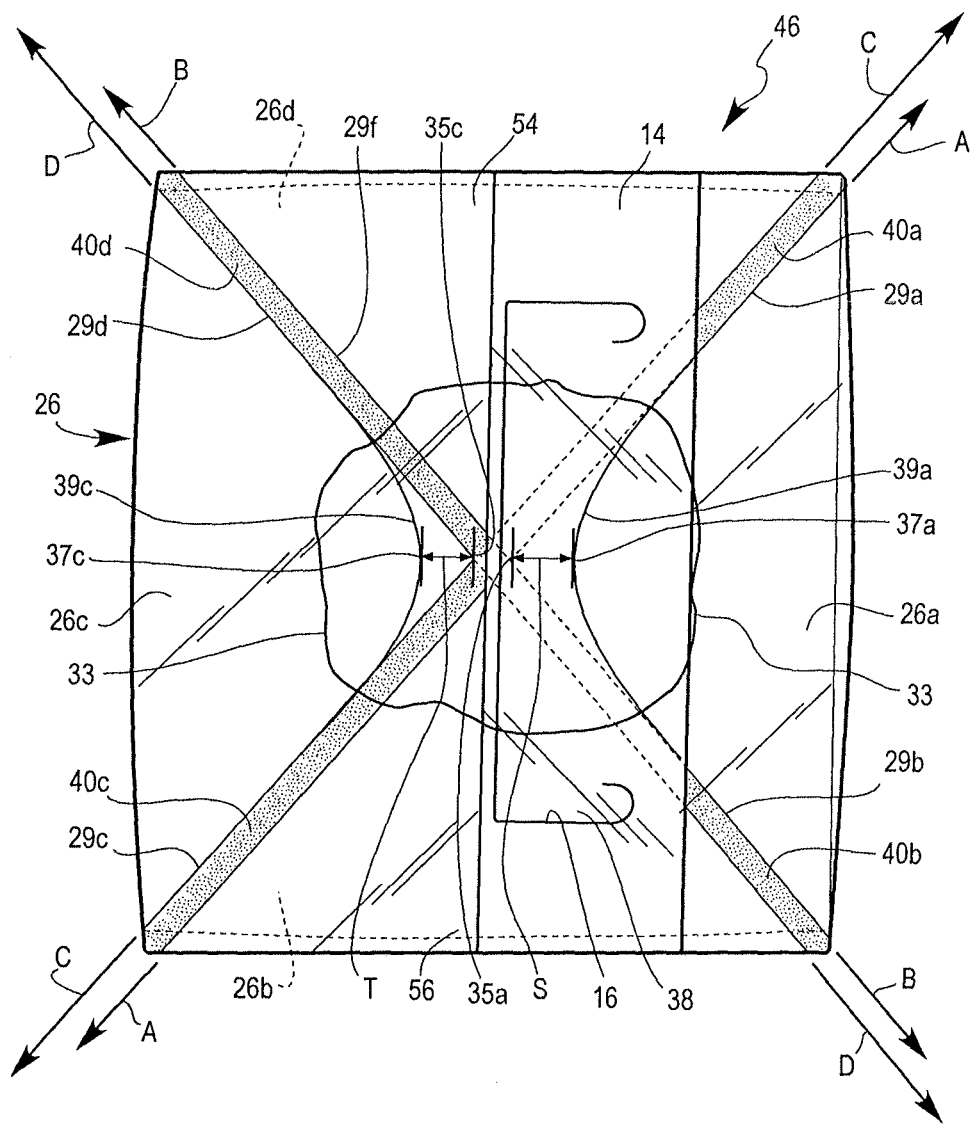
FIG. 2 is a bottom plan view of the flexible container of FIG. 1.

FIGS. 1-2 show a flexible container 10 having a flexible top 12 and a bottom 14. The flexible container 10 has four panels, a front panel 22, a back panel 24, a first gusset panel 18 and a second gusset panel 20. The four panels 18, 20, 22, and 24 extend toward a top end 44 and a bottom end 46 of the container 10 to form the top segment 28 and bottom segment 26, respectively. When the container 10 is inverted, the top and bottom positions in relation to the container 10 change. However, for consistency the handle adjacent the spout 30 will be called the top or upper handle 12 and the opposite handle will be called the bottom or lower handle 14. Likewise, the top or upper portion, segment or panel will be the surface adjacent the spout 30, and the bottom or lower portion, segment, or panel will be the surface opposite the top segment.

The four panels 18, 20, 22 and 24 can each be composed of a separate web of film. The composition and structure for each web of film can be the same or different. Alternatively, one web of film may also be used to make all four panels and the top and bottom segments. In a further embodiment, two or more webs can be used to make each panel.

In an embodiment, four webs of film are provided, one web of film for each respective panel 18, 20, 22, and 24. The edges of each film are sealed to the adjacent web of film to form peripheral seals 41 (FIG. 1). The peripheral tapered seals 40a-40d are located on the bottom segment 26 of the container as shown in FIG. 2. The peripheral seals 41 are located on the side edges of the container 10.

To form the top segment 28 and the bottom segment 26, the four webs of film converge together at the respective end and are sealed together. For instance, the top segment 28 can be defined by extensions of the panels sealed together at the top end 44 and when the container 10 is in a rest position it can have four top panels 28a-28d (FIG. 4) of film that define the top segment 28. The bottom segment 26 can also have four bottom panels 26a-26d of film sealed together and can also be defined by extensions of the panels at the opposite end 46 as shown in FIG. 2.

In an embodiment, a portion of the four webs of film that make up the top segment 28 terminate at a spout 30. A portion of a top end section of each of the four webs of film is sealed, or otherwise welded, to an outer, lower rim 52 of the spout 30 to form a tight seal. The spout is sealed to the flexible container by way of compression heat seal, ultrasonic seal, and combinations thereof. Although the base of spout 30 has a circular cross-sectional shape, it is understood that the base of spout 30 can have other cross-sectional shapes such as a polygonal cross-sectional shape, for example. The base with circular cross-sectional shape is distinct from fitments with canoe-shaped bases used for conventional two-panel flexible pouches.

In an embodiment, the outer surface of the base of spout 30 has surface texture. The surface texture can include embossment and a plurality of radial ridges to promote sealing to the inner surface of the top segment 28.

In an embodiment, the spout 30 excludes fitments with oval, wing-shaped, eye-shaped, or canoe-shaped bases.

Figure 5:
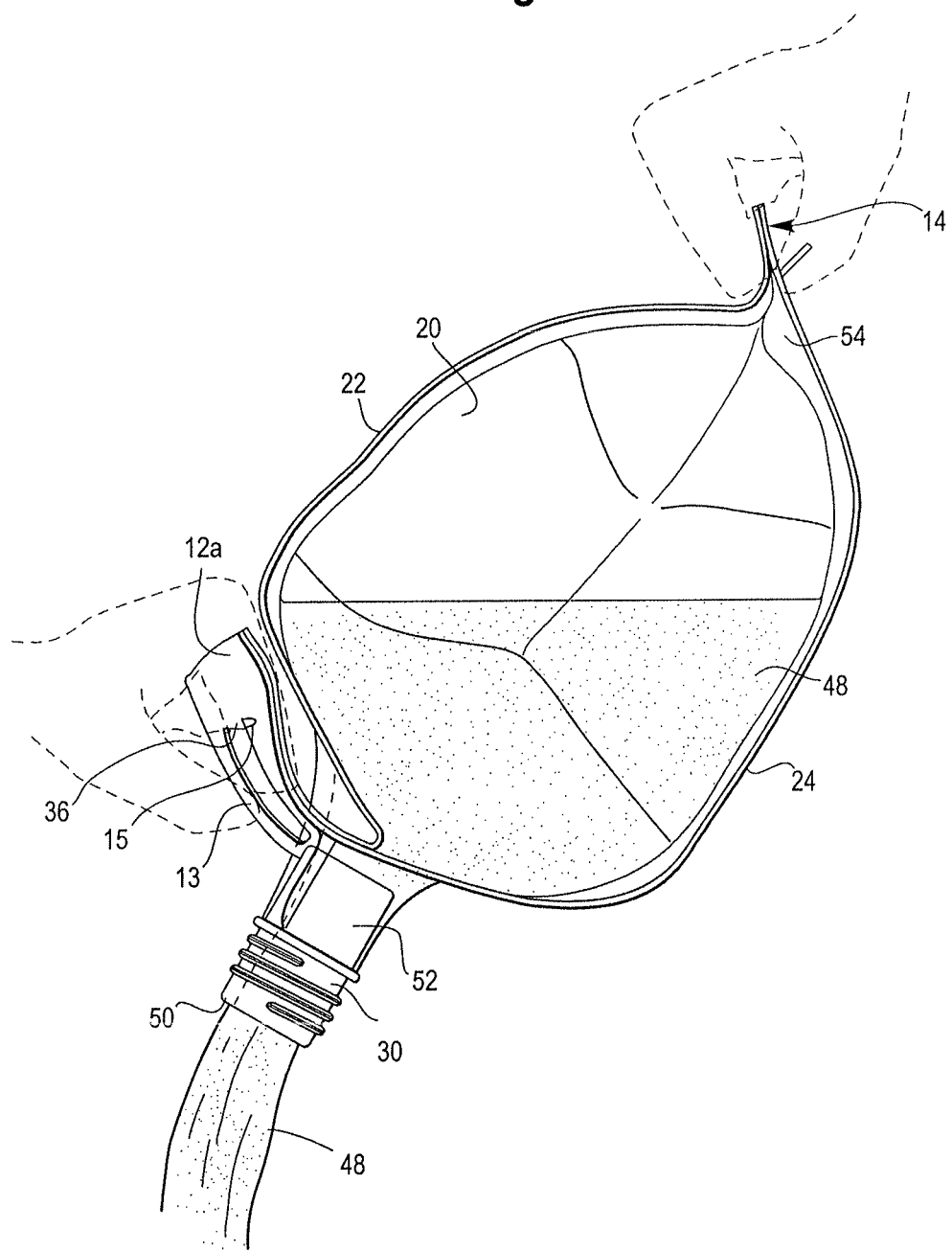
FIG. 5 is a side plan view of the flexible container of FIG. 11 in an inverted position for transferring the contents.
Figure 6:
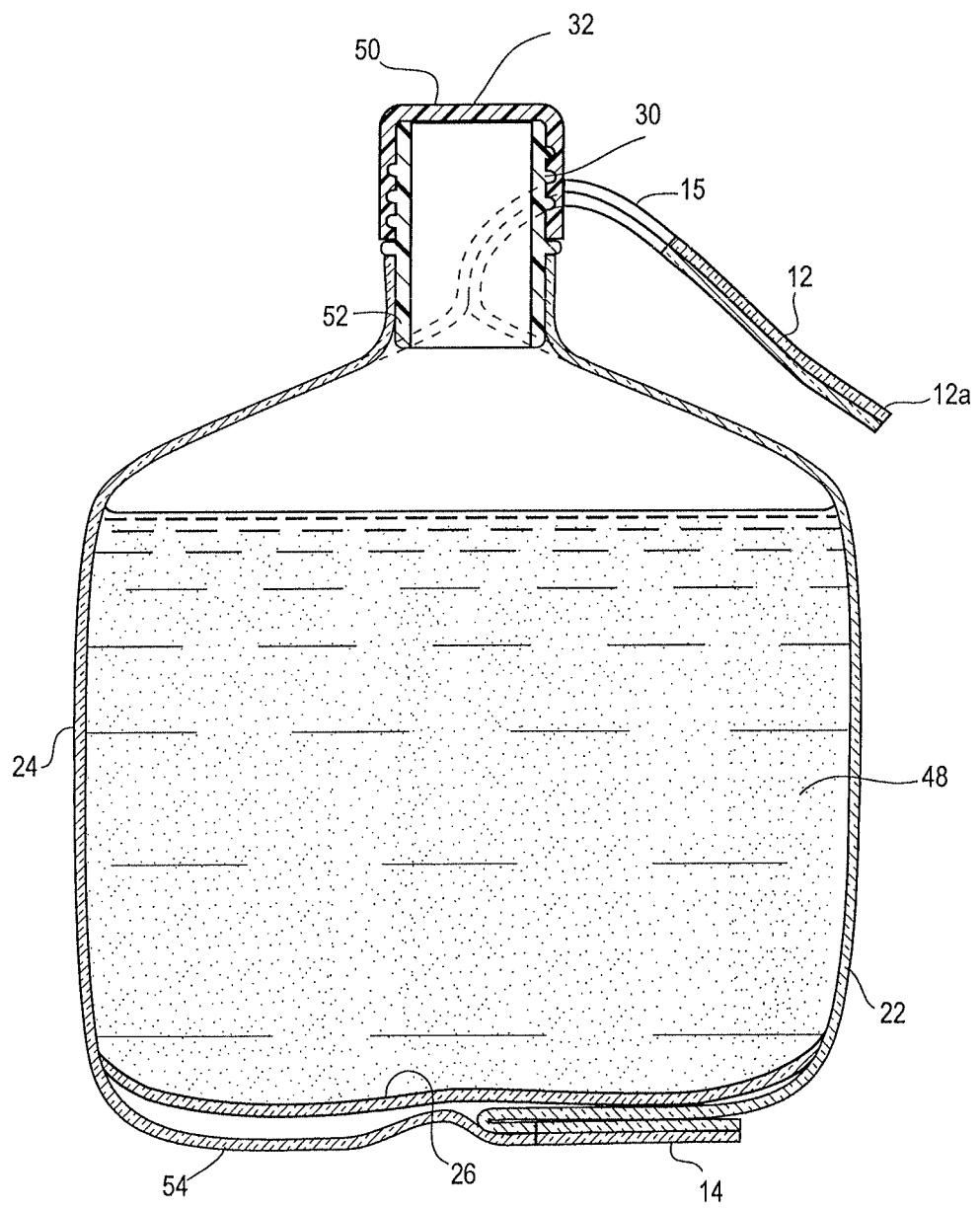
FIG. 6 is a cross-sectional view taken along the line 6-6 of FIG. 1.

Furthermore, the spout 30 can contain a removable closure 32. The spout 30 has an access opening 50 through the top segment 28 to the interior as shown in FIGS. 5-6. Alternatively, the spout 30 can be positioned on one of the panels, where the top segment would then be defined as an upper seal area defined by the joining together of at least two panel ends. In a further embodiment, the spout 30 is positioned at generally a midpoint of the top segment 28 and can be sized smaller than a width of the container 10, such that the access opening 50 of the spout 30 can have an area that is less than a total area of the top segment 28. In yet a further embodiment, the spout area is not more than 20% of the total top segment area. This can ensure that the spout 30 and its associated access opening 50 will not be large enough to insert a hand therethrough, thus avoiding any unintentional contact with the product 58 stored therein.

The spout 30 can be made of a rigid construction and can be formed of any appropriate plastic, such as high density polyethylene (HDPE), low density polyethylene (LDPE), polypropylene (PP), and combinations thereof. The location of the spout 30 can be anywhere on the top segment 28 of the container 10. In an embodiment the spout 30 is located at the center or midpoint of the top segment 28. The closure 32 covers the access opening 50 and prevents the product from spilling out of the container 10. The cap 32 may be a screw-on cap, a flip-top cap or other types of removable (and optionally reclosable) closures.

As shown in FIGS. 1-2, the flexible bottom handle 14 can be positioned at a bottom end 46 of the container 10 such that the bottom handle 14 is an extension of the bottom segment 26.

Each panel includes a respective bottom face. FIG. 2 shows four triangle-shaped bottom faces 26a, 26b, 26c, 26d, each bottom face being an extension of a respective film panel. The bottom faces 26a-26d make up the bottom segment 26. The four panels 26a-26d come together at a midpoint of the bottom segment 26. The bottom faces 26a-26d are sealed together, such as by using a heat-sealing technology, to form the bottom handle 14. For instance, a weld can be made to form the bottom handle 14, and to seal the edges of the bottom segment 26 together. Nonlimiting examples of suitable heat-sealing technologies include hot bar sealing, hot die sealing, impulse sealing, high frequency sealing, or ultrasonic sealing methods.

Figure 7:
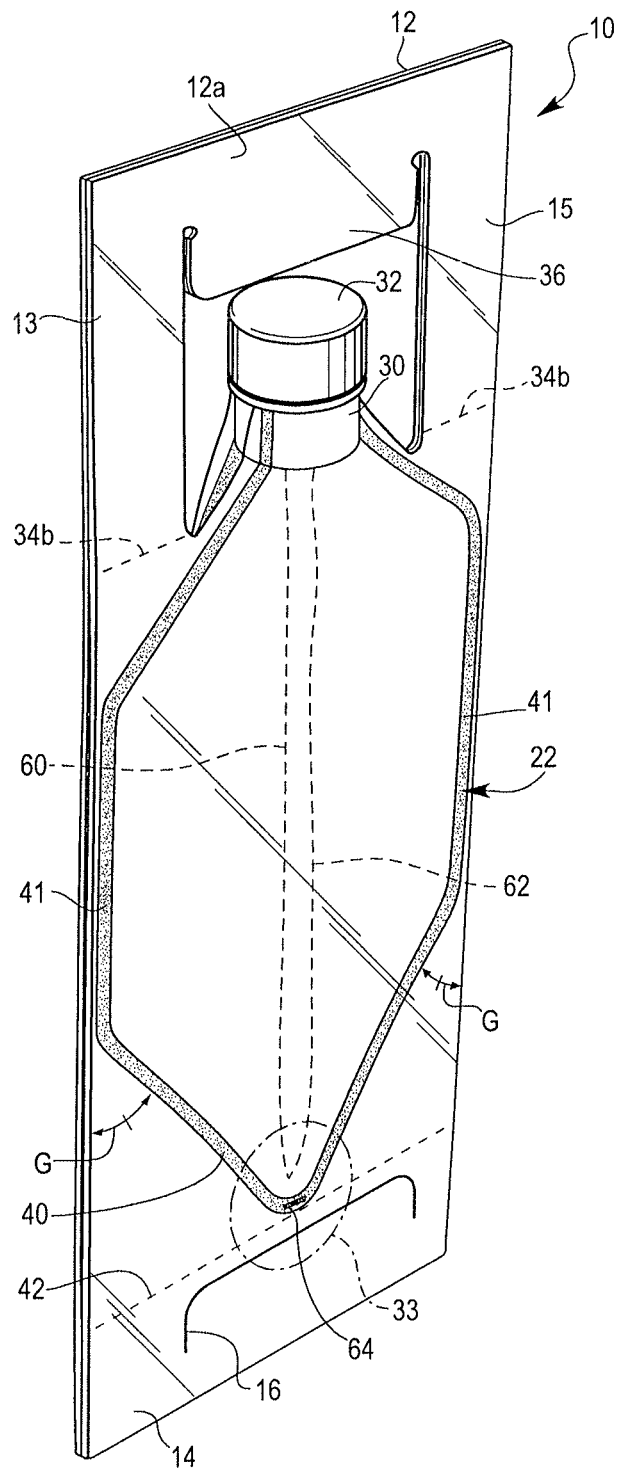
FIG. 7 is a perspective view of the container of FIG. 1 in a collapsed configuration.
Figure 8:
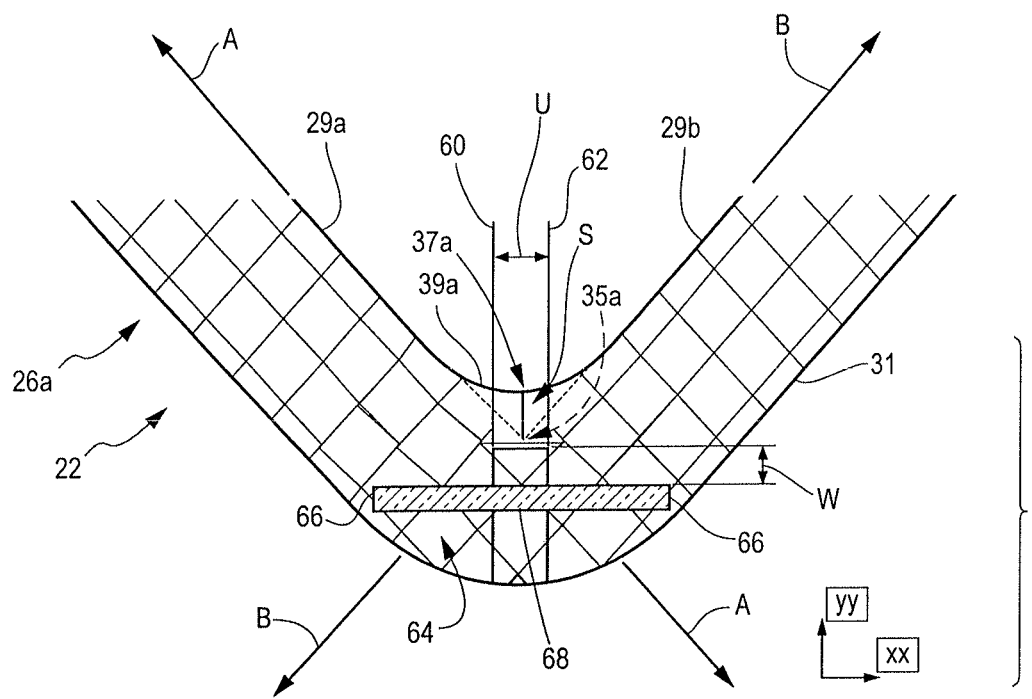
FIG. 8 is an enlarged view of the bottom seal area of FIG. 7.

FIG. 2 shows bottom segment 26. Each panel 18, 20, 22, 24 has a respective bottom face 26a-26d that is present in the bottom segment 26. Each bottom face is bordered by two opposing peripheral tapered seals 40a, 40b, 40c, 40d. Each peripheral tapered seal 40a-40d extends from a respective peripheral seal 41. The peripheral tapered seals for the front panel 22 and the rear panel 24 have an inner edge 29a-29d (FIG. 2) and an outer edge 31 (FIG. 8). The peripheral tapered seals 40a-40d converge at a bottom seal area 33 (FIG. 2, FIG. 7, FIG. 8).

The front panel bottom face 26a includes a first line A defined by the inner edge 29a of the first peripheral tapered seal 40a and a second line B defined by the inner edge 29b of the second peripheral tapered seal 40b. The first line A intersects the second line B at an apex point 35a in the bottom seal area 33. The front panel bottom face 26a has a bottom distalmost inner seal point 37a ("BDISP 37a"). The BDISP 37a is located on an inner seal edge defined by inner edge 29a and inner edge 29b.

The apex point 35a is separated from the BDISP 37a by a distance S from 0 millimeter (mm) to less than 8.0 mm.

In an embodiment, the rear panel bottom face 26c includes an apex point similar to the apex point on the front panel bottom face. The rear panel bottom face 26c includes a first line C defined by the inner edge of the 29c first peripheral tapered seal 40c and a second line D defined by the inner edge 29d of the second peripheral tapered seal 40d. The first line C intersects the second line D at an apex point 35c in the bottom seal area 33. The rear panel bottom face 26c has a bottom distalmost inner seal point 37c ("BDISP 37c"). The BDISP 37c is located on an inner seal edge defined by inner edge 29c and inner edge 29d. The apex point 35c is separated from the BDISP 37c by a distance T from 0 millimeter (mm) to less than 8.0 mm.

It is understood the following description to the front panel bottom face applies equally to the rear panel bottom face, with reference numerals to the rear panel bottom face shown in adjacent closed parentheses.

In an embodiment, the BDISP 37a (37c) is located where the inner edges 29a (29c) and 29b (29d) intersect. The distance between the BDISP 37a (37c) and the apex point 35a (35c) is 0 mm.

In an embodiment, the inner seal edge diverges from the inner edges 29a, 29b (29c, 29d), to form a distal inner seal arc 39a (front panel) a distal inner seal arc 39c (rear panel) as shown in FIGS. 2 and 8. The BDISP 37a (37c) is located on the inner seal arc 39a (39c). The apex point 35a (apex point 35c) is separated from the BDISP 37a (BDISP 37c) by the distance S (distance T) which is from greater than 0 mm, or 1.0 mm, or 2.0 mm, or 2.6 mm, or 3.0 mm, or 3.5 mm, or 3.9 mm, to 4.0 mm, or 4.5 mm, or 5.0 mm, or 5.2 mm, or 5.3 mm, or 5.5 mm, or 6.0 mm, or 6.5 mm, or 7.0 mm, or 7.5 mm, or 7.9 mm.

In an embodiment, apex point 35a (35c) is separated from the BDISP 37a (37c) by the distance S (distance T) which is from greater than 0 mm to less than 6.0 mm.

In an embodiment, the distance from S (distance T) from the apex point 35a (35c) to the BDISP 37a (37c) is from greater than 0 mm, or 0.5 mm or 1.0 mm, or 2.0 mm to 4.0 mm or 5.0 mm or less than 5.5 mm.

In an embodiment, apex point 35a (apex point 35c) is separated from the BDISP 37a (BDISP 37c) by the distance S (distance T) which is from 3.0 mm, or 3.5 mm, or 3.9 mm, to 4.0 mm, or 4.5 mm, or 5.0 mm, or 5.2 mm, or 5.3 mm, or 5.5 mm.

In an embodiment, the distal inner seal arc 39a (39c) has a radius of curvature from 0 mm, or greater than 0 mm, or 1.0 mm to 19.0 mm, or 20.0 mm.

In an embodiment, each peripheral tapered seal 40a-40d (outside edge) and an extended line from respective peripheral seal 41 (outside edge) form an angle G as shown in FIG. 7. The angle G is from 40° or 42°, or 44°, or 45° to 46°, or 48°, or 50°. In an embodiment, angle G is 45°.

The bottom segment 26 includes a pair of gussets 54 and 56 formed thereat, which are essentially extensions of the bottom faces 26a-26d. The gussets 54 and 56 can facilitate the ability of the flexible container 10 to stand upright. These gussets 54 and 56 are formed from excess material from each bottom face 26a-26d that are joined together to form the gussets 54 and 56. The triangular portions of the gussets 54 and 56 comprise two adjacent bottom segment panels sealed together and extending into its respective gusset. For example, adjacent bottom faces 26a and 26d extend beyond the plane of their bottom surface along an intersecting edge and are sealed together to form one side of a first gusset 54. Similarly, adjacent bottom faces 26c and 26d extend beyond the plane of their bottom surface along an intersecting edge and are sealed together to form the other side of the first gusset 54. Likewise, a second gusset 56 is similarly formed from adjacent bottom faces 26a-26b and 26b-26c. The gussets 54 and 56 can contact a portion of the bottom segment 26, where the gussets 54 and 56 can contact bottom faces 26b and 26d covering them, while bottom segment panels 26a and 26c remain exposed at the bottom end 46.

As shown in FIGS. 1-2, the gussets 54 and 56 of the flexible container 10 can further extend into the bottom handle 14. In the aspect where the gussets 54 and 56 are positioned adjacent bottom segment panels 26b and 26d, the bottom handle 14 can also extend across bottom faces 26b and 26d, extending between the pair of panels 18 and 20. The bottom handle 14 can be positioned along a center portion or midpoint of the bottom segment 26 between the front panel 22 and the rear panel 24.

The bottom handle 14 can comprise up to four layers of film sealed together when four webs of film are used to make the container 10. When more than four webs are used to make the container, the handle will include the same number of webs used to produce the container. Any portion of the bottom handle 14 where all four layers are not completely sealed together by the heat-sealing method, can be adhered together in any appropriate manner, such as by a tack seal to form a fully-sealed multi-layer bottom handle 14. The bottom handle 14 can have any suitable shape and generally will take the shape of the film end. For example, typically the web of film has a rectangular shape when unwound, such that its ends have a straight edge. Therefore, the bottom handle 14 would also have a rectangular shape.

Figure 3:
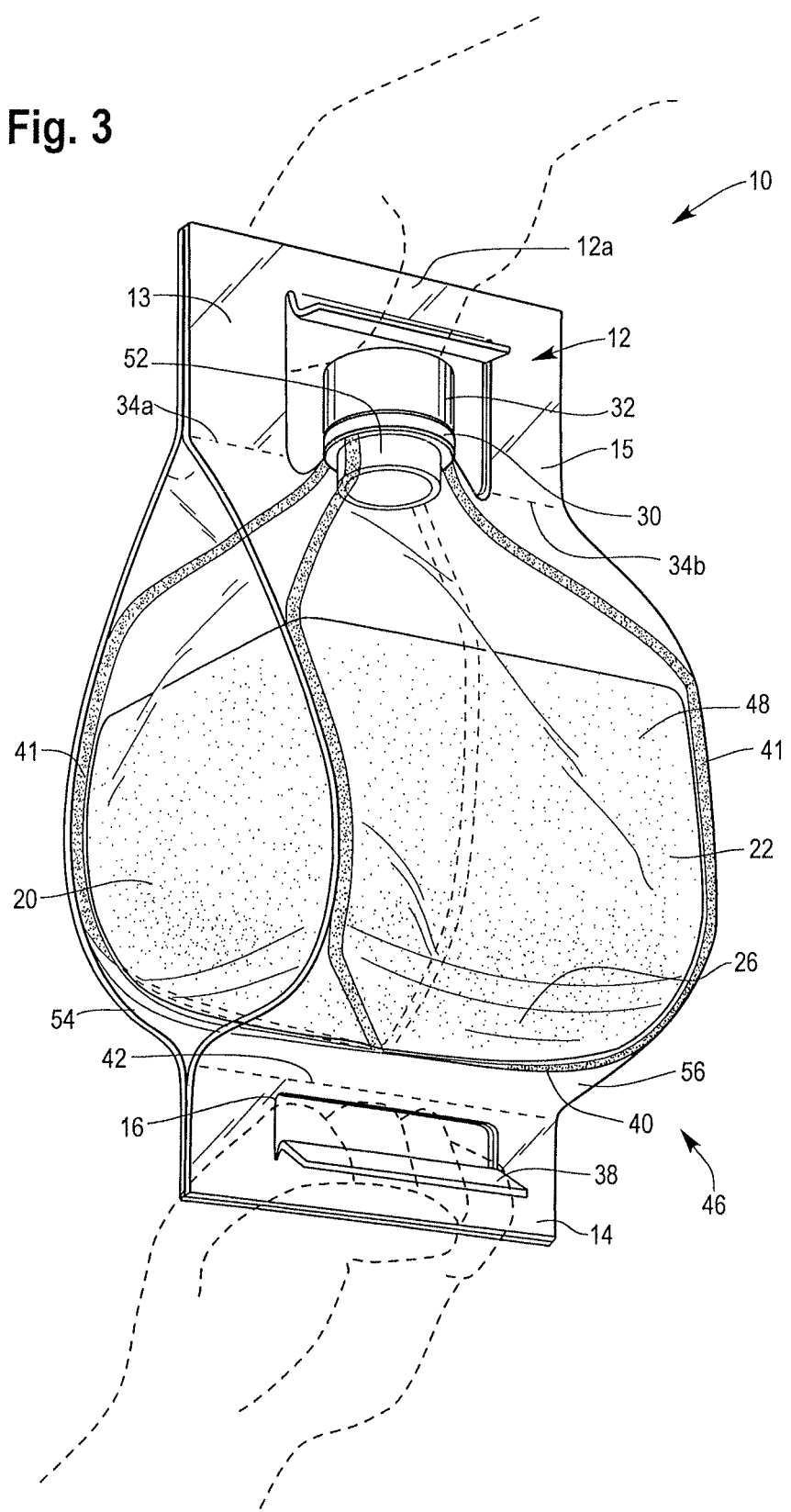
FIG. 3 is a perspective view of the flexible container of FIG. 1 shown with its top and bottom handles extended.

Additionally, the bottom handle 14 can contain a handle opening 16 or cutout section therein sized to fit a user's hand, as can be seen in FIG. 3. The opening 16 can be any shape that is convenient to fit the hand and, in one aspect, the opening 16 can have a generally oval shape. In another aspect, the opening 16 can have a generally rectangular shape. Additionally, the opening 16 of the bottom handle 14 can also have a flap 38 that comprises the cut material that forms the opening 16. To define the opening 16, the handle 14 can have a section that is cut out of the multilayer handle 14 along three sides or portions while remaining attached at a fourth side or lower portion. This provides a flap of material 38 that can be pushed through the opening 16 by the user and folded over an edge of the opening 16 to provide a relatively smooth gripping surface at an edge that contacts the user's hand. If the flap of material were completely cut out, this would leave an exposed fourth side or lower edge that could be relatively sharp and could possibly cut or scratch the hand when placed there.

Furthermore, a portion of the bottom handle 14 attached to the bottom segment 26 can contain a dead machine fold 42 or a score line that provides for the handle 14 to consistently fold in the same direction, as illustrated in FIGS. 1 and 3. The machine fold 42 can comprise a fold line that permits folding in a first direction toward the front side panel 22 and restricts folding in a second direction toward the rear panel 24. The term "restricts" as used throughout this application can mean that it is easier to move in one direction, or the first direction, than in an opposite direction, such as the second direction. The machine fold 42 can cause the handle 14 to consistently fold in the first direction because it can be thought of as providing a generally permanent fold line in the handle that is predisposed to fold in the first direction X, rather than in the second direction Y. This machine fold 42 of the bottom handle 14 can serve multiple purposes, one being that when a user is transferring the product from the container 10 they can grasp the bottom handle 14 and it will easily bend in the first direction X to assist in pouring. Secondly, when the flexible container 10 is stored in an upright position, the machine fold 42 in the bottom handle 14 encourages the handle 14 to fold in the first direction X along the machine fold 42, such that the bottom handle 14 can fold underneath the container 10 adjacent one of the bottom segment panels 26a, as shown in FIG. 6. The weight of the product can also apply a force to the bottom handle 14, such that the weight of the product can further press on the handle 14 and maintain the handle 14 in the folded position in the first direction X. As will be discussed herein, the top handle 12 can also contain a similar machine fold 34a-34b that also allows it to fold consistently in the same first direction X as the bottom handle 14.

Additionally, as the flexible container 10 is evacuated and less product remains, the bottom handle 14 can continue to provide support to help the flexible container 10 to remain standing upright unsupported and without tipping over. Because the bottom handle 14 is sealed generally along its entire length extending between the pair of side panels 18 and 20, it can help to keep the gussets 54 and 56 (FIG. 1, FIG. 3) together and continue to provide support to stand the container 10 upright even as the container 10 is emptied.

Figure 4:
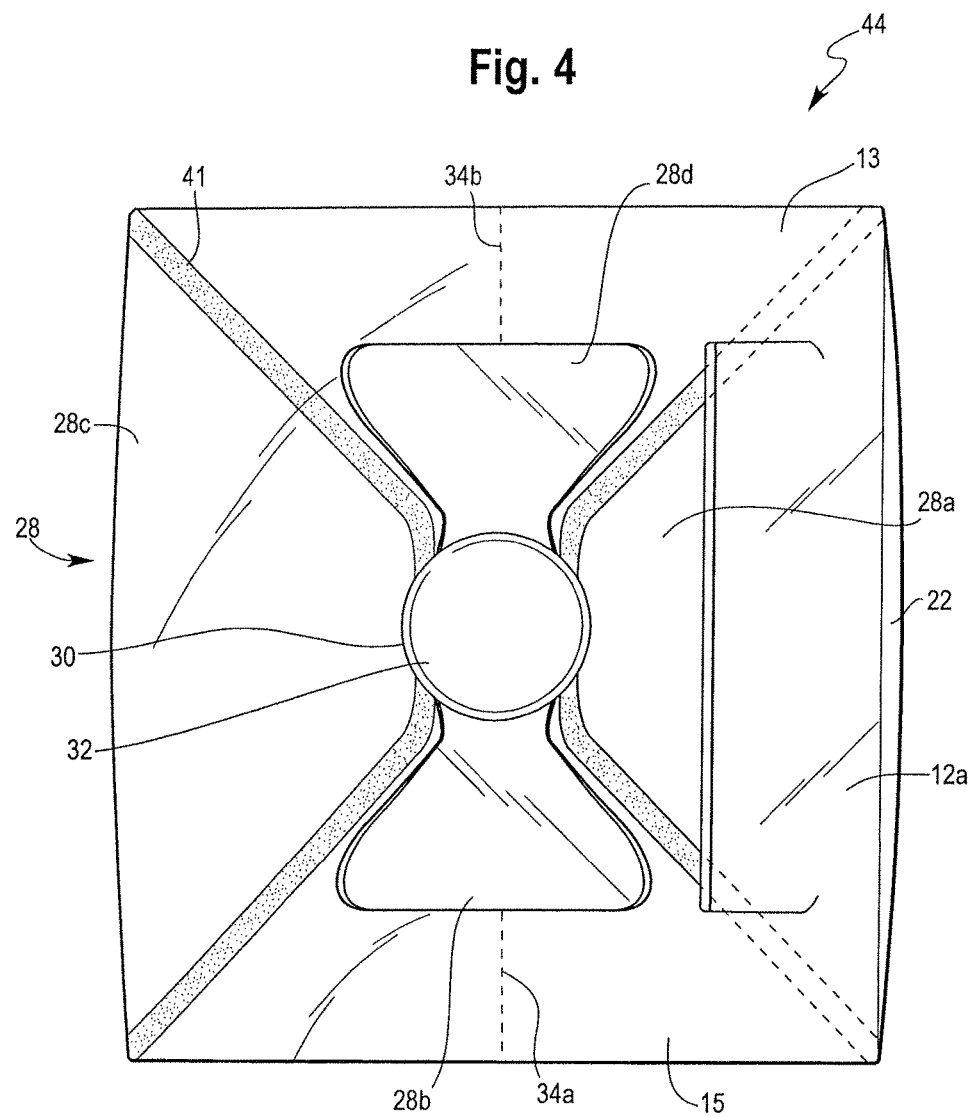
FIG. 4 is a top plan view of the flexible container of FIG. 1.

As seen in FIGS. 3-4, the top handle 12 can extend from the top segment 28 and, in particular, can extend from the four panels 28a-28d that make up the top segment 28. The four panels 28a-28d of film that extend into the top handle 12 are all sealed together to form a multi-layer top handle 12. The top handle 12 can have a U-shape and, in particular, an upside down U-shape with a horizontal upper handle portion 12a having a pair of spaced legs 13 and 15 extending therefrom. The legs 13 and 15 extend from the top segment 28, adjacent the spout 30 with one 13 on one side of the spout 30 and other leg 15 on the other side of the spout 30, with each leg 13, 15 extending from opposite portions of the top segment 28.

The bottommost edge of the upper handle portion 12a when extended in a position above the spout 30, can be just tall enough to clear the uppermost edge of the spout 30. A portion of the top handle 12 can extend above the spout 30 and above the top segment 28 when the handle 12 is extended in a position perpendicular to the top segment 28 and, in particular, the entire upper handle portion 12a can be above the spout 30 and the top segment 28. The two pairs of legs 13 and 15 along with the upper handle portion 12a together make up the handle 12 surrounding a handle opening that allows a user to place her hand therethrough and grasp the upper handle portion 12a of the handle 12.

As with the bottom handle 14, the top handle 12 also can have a dead machine fold 34a-34b that permits folding in a first direction toward the front side panel 22 and restricts folding in a second direction toward the rear side panel 24. The machine fold 34a-34b can be located in each leg 13, 15 at a location where the seal begins. The handle 12 can be adhered together, such as with a tack adhesive, beginning from the machine folded portion 34a-34b up to and including the horizontal upper handle portion 12a of the handle 12. The positioning of the machine fold 34a-34b can be in the same latitude plane as the spout 30 and, in particular, as the bottommost portion of the spout 30. The two machine folds 34a-34b in the handle 12 can allow for the handle 12 to be inclined to fold or bend consistently in the same first direction X as the bottom handle 14, rather than in the second direction Y. As shown in FIGS. 1 and 3, the handle 12 can likewise contain a flap portion 36, that folds upwards toward the upper handle portion 12a of the handle 12 to create a smooth gripping surface of the handle 12, as with the bottom handle 14, such that the handle material is not sharp and can protect the user's hand from getting cut on any sharp edges of the handle 12.

When the container 10 is in a rest position, such as when it is standing upright on its bottom segment 26, as shown in FIG. 1, the bottom handle 14 can be folded underneath the container 10 along the bottom machine fold 42 in the first direction X, so that it is parallel to the bottom segment 26 and adjacent bottom panel 26a, and the top handle 12 will automatically fold along its machine fold 34a-34b in the same first direction X, with a front surface of the handle 12 parallel to a top section or panel 28a of the top segment 28. The top handle 12 folds in the first direction X, rather than extending straight up, perpendicular to the top segment 28, because of the machine folds 34a-34b. Both handles 12 and 14 are inclined to fold in the same direction X, such that upon dispensing the handles can fold the same direction, relatively parallel to its respective end panel or end segment, to make dispensing easier and more controlled. Therefore, in a rest position, the handles 12 and 14 are both folded generally parallel to one another. Additionally, the flexible container 10 can stand upright even with the bottom handle 14 positioned underneath the upright flexible container 10.

Alternatively, in another aspect the flexible container can contain a fitment or pour spout positioned on a sidewall, where the top handle is essentially formed in and from the top portion or segment. The top handle can be formed from the four webs of film, each extending from its respective sidewall, extending into a sidewall or flap positioned at the top end of the container, such that the top segment of the container converges into the handle and they are one and the same, with the spout to the side of the extended handles, rather than underneath.

The material of construction of the flexible container 10 can comprise a food-grade plastic. For instance, nylon, polypropylene, polyethylene such as high density polyethylene (HDPE) and/or low density polyethylene (LDPE) may be used as discussed later. The film of the flexible container 10 can have a thickness that is adequate to maintain product and package integrity during manufacturing, distribution, product shelf life and customer usage. In an embodiment, the flexible multilayer film has a thickness from 100 micrometers, or 200 micrometers, or 250 micrometers to 300 micrometers, or 350 micrometers, or 400 micrometers. The film material can also be such that it provides the appropriate atmosphere within the flexible container 10 to maintain the product shelf life of at least about 180 days. Such films can comprise an oxygen barrier film, such as a film having a low oxygen transmission rate (OTR) from 0, or greater than 0 to 0.4, or 1.0 cc/m$^2$/24 hrs/atm) at 23° C. and 80% relative humidity (RH). Additionally, the flexible multilayer film can also comprise a water vapor barrier film, such as a film having a low water vapor transmission rate (WVTR) from 0, or greater than 0, or 0.2, or 1.0 to 5.0, or 10.0, or 15.0 g/m$^2$/24 hrs at 38° C. and 90% RH. Moreover, it may be desirable to use materials of construction having oil and/or chemical resistance particularly in the seal layer, but not limited to just the seal layer. The flexible multilayer film can be either printable or compatible to receive a pressure sensitive label or other type of label for displaying of indicia on the flexible container 10.

In an embodiment, each panel is made from a flexible multilayer film having at least one, or at least two, or at least three layers. The flexible multilayer film is resilient, flexible, deformable, and pliable. The structure and composition of the flexible multilayer film for each panel may be the same or different. For example, each of the four panels can be made from a separate web, each web having a unique structure and/or unique composition, finish, or print. Alternatively, each of the four panels can be the same structure and the same composition.

In an embodiment, each panel 18, 20, 22, 24 is a flexible multilayer film having the same structure and the same composition.

The flexible multilayer film may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

In another embodiment, the flexible multilayer film can comprise a bladder wherein two or more films that are adhered in such a manner as to allow some delamination of one or more plies to occur during a significant impact such that the inside film maintains integrity and continues to hold contents of the container.

Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C., to 30° C., or 40° C. or higher than the melting point of the polymer in the seal layer wherein the outer layer polymer is selected from resins such as VERSIFY or VISTAMAX, ELITE™, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), and blends thereof. The flexible multilayer film also includes an outer layer that is a polyamide.

In an embodiment, the flexible multilayer film is a coextruded film and includes:

(i) a seal layer composed of an olefin-based polymer having a first melt temperature less than 105° C., (Tm1); and (ii) an outer layer composed of a polymeric material having a second melt temperature, (Tm2), wherein $Tm2-Tm1 > 40°$ C.

The term "$Tm2-Tm1$" is the difference between the melt temperature of the polymer in the outer layer and the melt temperature of the polymer in the seal layer, and is also referred to as "$\Delta Tm$." In an embodiment, the $\Delta Tm$ is from 41° C., or 50° C., or 75° C., or 100° C., to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$ and the outer layer is composed of a polyamide having a Tm from 170° C. to 270° C.

In an embodiment, the flexible multilayer film is a coextruded film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$ and an outermost layer composed of a polyamide having a Tm from 170° C. to 270° C.

In an embodiment, the flexible multilayer film is a coextruded film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is a polyamide having a Tm from 170° C. to 270° C.

In an embodiment, the flexible multilayer film includes a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a heat seal initiation temperature (HSIT) from 65° C. to less than 125° C. In a further embodiment, the seal layer of the flexible multilayer film has an HSIT from 65° C., or 70° C., or 75° C., or 80° C., or 85° C., or 90° C., or 95° C., or 100° C. to 105° C., or 110° C., or 115° C., or 120° C., or less than 125° C. Applicant discovered that the seal layer with an ethylene-based polymer with a HSIT from 65° C. to less than 125° C. advantageously enables the formation of secure seals and secure sealed edges around the complex perimeter of the flexible container. The ethylene-based polymer with HSIT from 65° C. to less than 125° C. is a robust sealant which also allows for better sealing to the rigid fitment which is prone to failure. The ethylene-based polymer with HSIT from 65° C. to 125° C. enables lower heat sealing pressure/temperature during container fabrication. Lower heat seal pressure/temperature results in lower stress at the fold points of the gusset, and lower stress at the union of the films in the top segment and in the bottom segment. This improves film integrity by reducing wrinkling during the container fabrication. Reducing stresses at the folds and seams improves the finished container mechanical performance. The low HSIT ethylene-based polymer seals at a temperature below what would cause the outer layer to be compromised.

In an embodiment, the flexible multilayer film is a coextruded five layer film, or a coextruded seven layer film having at least two layers containing an ethylene-based polymer. The ethylene-based polymer may be the same or different in each layer.

In an embodiment, the flexible multilayer film is a coextruded five layer, or a coextruded seven layer film having at least two layers containing a polyamide polymer.

In an embodiment, the flexible multilayer film is a seven-layer coextruded film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 104° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

Flexible container 10 has an expanded configuration (shown in FIGS. 1-6) and a collapsed configuration as shown in FIG. 7. When the container 10 is in the collapsed configuration, the flexible container is in a flattened, or in an otherwise evacuated state. The gusset panels 18, 20 fold inwardly (dotted lines of FIG. 7) and are sandwiched by the front panel 22 and the rear panel 24.

FIG. 8 shows an enlarged view of the bottom seal area 33 of FIG. 7 and the front panel 26*a*. The fold lines 60 and 62 of respective gusset panels 18, 20 are separated by a distance U that is from 0 mm, or 0.5 mm, or 1.0 mm, or 2.0 mm to 12.0 mm, or 60 mm, or greater than 60 mm. In an embodiment, distance U varies based on the size and volume of the flexible container 10. For example, the flexible container 10 may have a distance U (in mm) that is from greater than 0 mm to three times the volume (in liters) of the container. For example, a 2-liter flexible container can have a distance U from greater than 0 to less than or equal to 6.0 mm. In another example, a 20-liter flexible container 10 has a distance U that is from greater than 0 mm to less than or equal to 60 mm.

FIG. 8 shows line A (defined by inner edge 29*a*) intersecting line B (defined by inner edge 29*b*) at apex point 35*a*. BDISP 37*a* is on the distal inner seal arc 39*a*. Apex point 35*a* is separated from BDISP 37*a* by distance S having a length from greater than 0 mm or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.5 mm, or 6.0 mm, or 6.5 mm, or 7.0 mm, or 7.5 mm, or 7.9 mm.

In FIG. 8, an overseal 64 is formed where the four peripheral tapered seals 40*a*-40*d* converge in the bottom seal area. The overseal 64 includes 4-ply portions 66, where a portion of each panel (18, 20, 22, 24) is heat sealed to a portion of every other panel. Each panel represents 1-ply in the 4-ply heat seal. The overseal 64 also includes a 2-ply portion 68 where two panels (front panel 22 and rear panel 24) are sealed together. Consequently, the "overseal," as used herein, is the area where the peripheral tapered seals converge and that is subjected to a subsequent heat seal operation (and subjected to at least two heat seal operations altogether). The overseal 64 is located in the peripheral tapered seals and does not extend into the chamber of the flexible container 10.

In an embodiment, the apex point 35*a* is located above the overseal 64. The apex point 35*a* is separated from, and does not contact the overseal 64. The BDISP 37*a* is located above the overseal 64. The BDISP 37*a* is separated from and does not contact the overseal 64.

In an embodiment, the apex point 35*a* is located between the BDISP 37*a* and the overseal 64, wherein the overseal 64 does not contact the apex point 35*a* and the overseal 64 does not contact the BDISP 37*a*.

The distance between the apex point 35*a* to the top edge of the overseal 64 is defined as distance W shown in FIG. 8. In an embodiment, the distance W has a length from 0 mm, or greater than 0 mm, or 2.0 mm, or 4.0 mm to 6.0 mm, or 8.0 mm, or 10.0 mm or 15.0 mm.

When more than four webs are used to produce the container, the portion 68 of the overseal 64 may be a 4-ply, or a 6-ply, or an 8-ply portion.

In an embodiment, the flexible container 10 has a vertical drop test pass rate from 90%, or 95% to 100%. The vertical drop test is conducted as follows. The container is filled with tap water to its nominal capacity, conditioned at 25° C. for at least 3 hours, held in an upright position from its upper handle at 1.5 m height (from the base or side of the container to the ground), and released to a free fall drop onto a concrete slab floor. If any leak is detected immediately after the drop, the test is recorded as a failure. If no leak is detected immediately after the drop, the test is recorded as a success or "pass." A minimum of twenty flexible containers are tested. A percentage for pass/fail containers is then calculated.

In an embodiment, the flexible container 10 has a side drop pass rate from 90%, or 95% to 100%. This side drop test is conducted as follows. The container is filled with tap water to its nominal capacity, conditioned at 25° C. for at least 3 hours, held in upright position from its upper handle. The flexible container is released on its side from a 1.5 m height to a free fall drop onto a concrete slab floor. If any leak is detected immediately after the drop, the test is recorded as failure. If no leak is detected immediately after the drop, the test is recorded as a success or "pass." A minimum of twenty flexible containers are tested. A percentage for pass/fail containers is then calculated.

In an embodiment, the flexible container 10 passes the stand-up test where the package is filled with water at ambient temperature and placed on a flat surface for seven days. The flexible container remains in the same position, with unaltered shape or position for the seven days.

In an embodiment, the flexible container 10 has a volume from 0.25 liters (L), or 0.5 L, or 0.75 L, or 1.0 L, or 1.5 L, or 2.5 L, or 3 L, or 3.5 L, or 4.0 L, or 4.5 L or 5.0 L to 6.0 L, or 7.0 L, or 8.0 L, or 9.0 L or 10.0 L, or 20 L, or 30 L.

The flexible container 10 can be used to store any number of flowable substances therein. In particular, a flowable food product can be stored within the flexible container 10. In one aspect, flowable food products such as salad dressings, sauces, dairy products, mayonnaise, mustard, ketchup, other condiments, beverages such as water, juice, milk, or syrup, carbonated beverages, beer, wine, animal feed, pet feed, and the like can be stored inside of the flexible container 10.

The flexible container 10 is suitable for storage of other flowable substances including, but not limited to, oil, paint, grease, chemicals, suspensions of solids in liquid, and solid particulate matter (powders, grains, granular solids).

The flexible container 10 is suitable for storage of flowable substances with higher viscosity and requiring application of a squeezing force to the container in order to discharge. Nonlimiting examples of such squeezable and flowable substances include grease, butter, margarine, soap, shampoo, animal feed, sauces, and baby food.

The present disclosure provides a process for producing a flexible container, such as flexible container 10. In an embodiment, the process for producing a flexible container includes:

A. providing a rear panel web, a front panel web, a first folded gusset panel web, and a second folded gusset panel web, each panel web having peripheral edges and a bottom face, each bottom face having two opposing tapered edges meeting at a bottom end;

B. placing the folded gusset panel webs between the rear panel web and the front panel web, the gusset panel webs opposing each other, the panel webs configured to form a common periphery and the bottom seal area including the bottom end of each panel;

C. first sealing the peripheral edges, the tapered edges, and the bottom seal area under a first heat seal condition;

D. second sealing the bottom seal area under a second heat seal condition; and

E. forming a flexible container.

Figure 9:
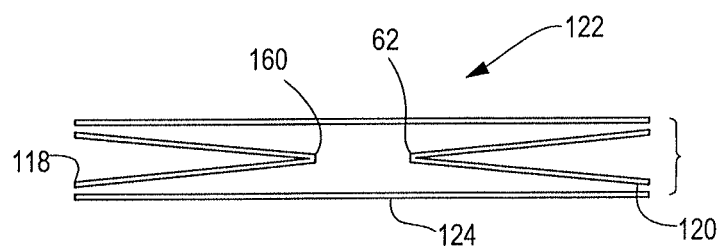
FIG. 9 is an exploded side elevation view of a web sandwich.

FIG. 9 shows the relative positions of the various webs (in a "one up" configuration) as they pass through the fabrication process. For clarity, the webs are shown separated and the heat seals not made. The constituent webs are first gusset panel web 118, second gusset panel web 120, front panel web 122 and rear panel web 124. The webs 118-124 can be any flexible multilayer film as previously disclosed herein. In an embodiment, the webs 118-124 form respective first gusset panel 18, second gusset panel 20, front panel 22 and rear panel 24 in the flexible container 10 discussed above. In an embodiment, the gusset fold lines 160 and 162 in FIG. 9 correspond to the gusset fold lines 60, 62 of the flexible container 10 in FIG. 8.

While the webs 118-124 are discussed herein as if they were separate pieces of material, it will be appreciated that any number of the seams between the webs could be "pre-made," as by folding one or more of the source webs to create the effect of a seam or seams. For example, if it were desired to fabricate the present flexible container from two webs instead of four, the bottom, left center, and right center webs could be a single folded web, instead of three separate webs. Similarly, one, two, or more webs may be used to produce each respective panel (i.e., a bag-in-a-bag configuration or a bladder configuration).

Figure 10:
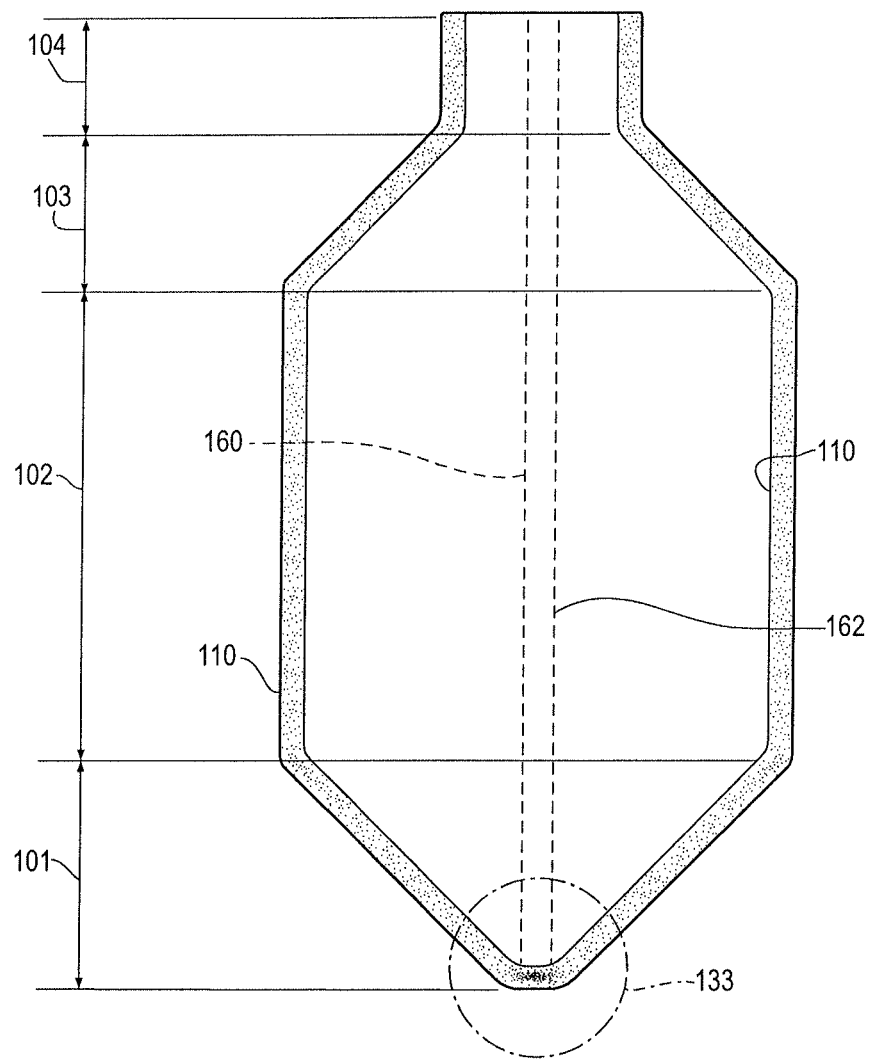
FIG. 10 is a schematic representation (top plan view) of a sealed flexible container in the collapsed configuration.

As shown in FIG. 9, the folded gusset panel webs 118, 120 are placed between the rear panel web 124 and the front panel web 122 to form a "web sandwich." The gusset panel web 118 opposes the gusset panel web 120. The edges of the panel webs 118-124 are configured, or otherwise arranged, to form a common periphery 110 as shown in FIG. 10. The common periphery 110 includes the bottom seal area including the bottom end of each panel. Each panel web is made from a flexible multilayer film. The flexible multilayer film may be any flexible multilayer film as previously disclosed herein. The flexible multilayer film of each panel web is configured so that the heat seal layers face each other. The gusset fold lines 160, 162 extend inwardly from the peripheral edges.

The present process includes first sealing the peripheral edges, the tapered peripheral edges, and the bottom seal area under a first heat seal condition. The first sealing step is a heat sealing procedure which utilizes a heat seal apparatus. The heat seal apparatus includes heatable sealing jaws that are moved from an open position to a closed position. The sealing jaws cooperatively engage the web sandwich from opposing sides. The sealing jaws have a shape that defines the perimeter of the collapsed flexible container as shown in FIG. 10.

FIG. 10 depicts the outline of the flexible container in the collapsed configuration as shaped by the sealing jaws, (except without the fitment and without the handles), and with the gusset panels folded. What can be seen are the front panel web 122, and the common periphery 110. Section 101 is a portion of what will become the bottom segment, section 102 is what will become the front panel, section 103 is a portion of the transition section, and section 104 is a portion of the bottle neck (where the fitment is placed). The dashed lines 160 and 162 indicate the gusset fold lines. The bottom seal area 133 becomes the bottom seal area 33 as previously disclosed herein.

In the closed position, the two opposing sealing jaws come into direct contact with the outermost layers of the web sandwich—namely, the outermost layer of the top panel web 122 and the outermost layer of the bottom panel web 124. The sealing jaws apply heat under pressure to the outermost film layers for a period of time (dwell time), at a predetermined sealing pressure, and a predetermined sealing temperature. During the dwell time, heat is transferred from the sealing jaws, through the outermost layer of the film to melt and fuse the opposing inner seal layers to form a heat seal. Generally, the outermost layer of the flexible multilayer film has a higher melting temperature than the seal layer. As such, while the seal layer is melted to form a seal, the outermost layer of the film does not melt, and does not stick, or does not substantially stick, to the sealing jaws. Surface treatments to the sealing jaw bars may be applied to further reduce stickiness effects to the films. After the sealing jaws reopen, the film is cooled to room temperature.

The first sealing step forms the peripheral seals of the flexible container. FIG. 10 is a schematic representation showing the peripheral seals of the collapsed container with the top handle and the bottom handle removed. In an embodiment, the peripheral seals include peripheral seals 41 and peripheral tapered seals 40a-40d of the flexible container 10 as disclosed above. The first sealing step also forms the bottom seal area 133 as shown in FIG. 10.

In an embodiment, the first sealing step forms the peripheral seals simultaneously, or substantially simultaneously. In a further embodiment, the peripheral seals in at least one of the sections 101, 102, 103, and 104 are formed at different times. For example, peripheral seals in sections 102, 103, 104 can be formed at a first time. A fitment (such as the spout) can be inserted through unsealed section 101 and inserted into the neck and subsequently heat sealed to the neck. The peripheral seals in section 101 can then be formed to form a closed flexible container at a second time that is after the first time.

In an embodiment, a continuous web sandwich is advanced to a heat sealing apparatus. The process includes advancing the continuous web sandwich and forming peripheral seals at section 101 of a first container (made from the web sandwich) while simultaneously, or substantially simultaneously forming peripheral seals at sections 102, 103, 104 of a second flexible container (made from web sandwich).

Figure 11:
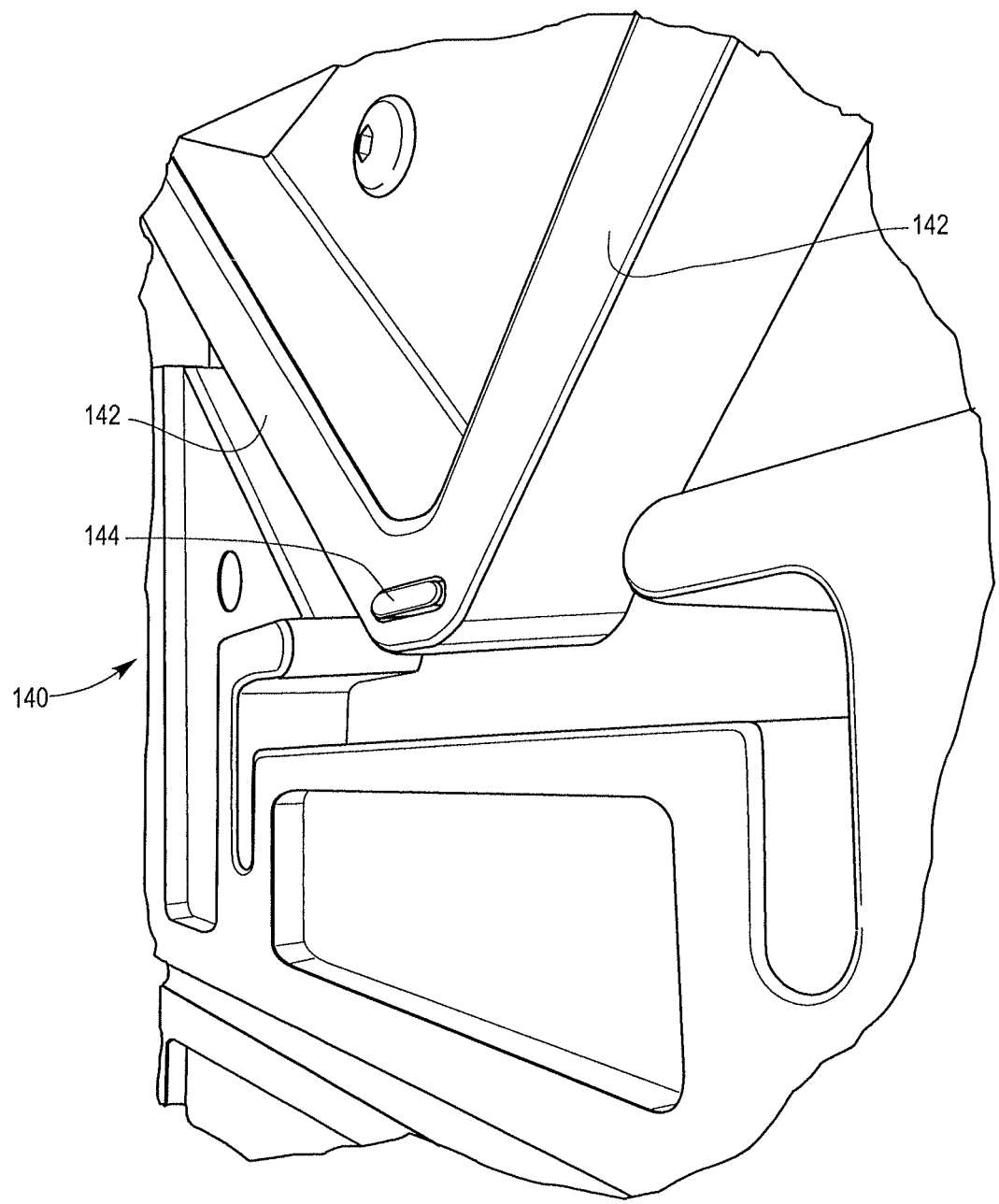
FIG. 11 is a perspective view of a portion of a heat seal apparatus in accordance with an embodiment of the present disclosure.

The process includes second sealing at least a portion of the bottom seal area under a second heat seal condition and forming a flexible container. FIG. 11 shows a portion of a heat seal apparatus 140. Shown in FIG. 11 is the bottom seal portion for one sealing jaw 142 of the heat seal apparatus 140. The heat seal apparatus 140 includes a sealing jaw 142 and an overseal bar 144. In cooperation with an opposing sealing jaw (not shown), the portion of the heat seal apparatus shown in FIG. 11 forms the bottom seal area 133 of the flexible container shown in FIG. 10. In an embodiment, the bottom seal area 133 corresponds to the bottom seal area 33 of the flexible container 10 as previously disclosed herein.

The overseal bar 144 extends outward, away from the sealing jaw 142. The "protrusion height" is the distance (in millimeters) the overseal bar 144 extends away from the sealing jaw 142. When the opposing sealing jaws of the heat seal apparatus 140 close on the web sandwich to form the peripheral seals, the overseal bar 144 directly contacts the outermost film layer and fuses the inner seal layers to form the overseal in the bottom seal area 133. The protrusion of the overseal bar 144 from the sealing jaw 142 creates a second heat seal condition (different than the first heat seal condition) because the overseal bar 144 imparts an additional pressure to the pressure imparted to the peripheral seal by the sealing jaws. Closing the sealing jaws brings the overseal bar 144 into contact with the web sandwich—and into contact with the outermost film layers in particular. During the dwell time, heat is transferred from the overseal bar 144, through the outermost layer of the film to melt and fuse the opposing inner seal layers to form the overseal. Nonlimiting examples for the shape of the overseal bar (and the resultant overseal) include rectangle, square, ellipse, oval, half moon, circle, and pyramid. The overseal bar can also have rounded edges and rounded sides.

In an embodiment, the protrusion height of the overseal bar 144 is adjustable or is otherwise variable. In other words, the overseal bar 144 is moveable so that the degree (or distance) to which the overseal bar extends away from the sealing jaw can be changed or varied, i.e., the overseal bar 144 can be raised or lowered. The process includes determining the total thickness of the web sandwich to be sealed in the bottom seal area and adjusting the protrusion height of the overseal bar 144 to be from 25% to 50%, or 75% of the web sandwich thickness. With adjustment of the protrusion height, the seal pressure of the overseal bar can be tailored to produce an overseal with varying seal strength in order to meet the demands/application of the formed flexible container.

In an embodiment, the process includes determining the total thickness of the web sandwich to be sealed in the bottom seal area and adjusting the protrusion height to 50% of the web sandwich total thickness.

In an embodiment, the overseal bar 144 forms the overseal 64 shown in FIG. 8. The overseal 64 is formed in a portion of the bottom seal area 133 (which corresponds to bottom seal area 33 of FIG. 7. In this way, the overseal bar 144 forms a second seal—overseal 64—in a portion of the bottom seal area 133. The overseal 64 in the YY direction (see FIG. 8) is determined by the width of the overseal bar 144. In an embodiment, the overseal bar 144 (and the overseal 64) has a width from 1 mm, or 2 mm, to 3 mm, or 4 mm. In a further embodiment, the width of the overseal 64 does not extend beyond the area of the peripheral seal.

The overseal 64 in the XX direction (see FIG. 8) is determined by the length of the overseal bar 144. The overseal bar 144 has a length that extends and covers the area centered between 60 and 62 in the XX direction. In an embodiment, the overseal bar 144 has a length greater than the distance U, or greater than the length between 60 and 62. In a further embodiment, the overseal bar (and the overseal 64) has a length greater than 0 mm, or 0.5 mm, or 1 mm, or 2 mm to 3 mm, or 4 mm or 5 mm, or greater than 5 mm. In a further embodiment, the length of the overseal 64 does not extend past the area of the peripheral seal.

In an embodiment, the overseal can be overseal 64 with a rectangular shape as shown in FIG. 8.

In an embodiment, the opposing sealing jaw (not shown) can be flat.

In an embodiment, the opposing sealing jaw (not shown) also includes an overseal bar that aligns with and cooperates with the overseal bar 144 shown in FIG. 11. When the sealing jaws close, the two opposing overseal bars apply additional pressure to the web sandwich in addition to the pressure imparted by the sealing jaws. In this case, the combined protrusion height provides the overseal pressure. The combined protrusion height of the two overseal bars is from 25% to 50%, or 75% of the web sandwich total thickness.

In an embodiment, the combined protrusion height of the two overseal bars is 50% of the total thickness of the web sandwich.

In an embodiment, in the bottom seal area, the web sandwich includes a 2-ply portion (front panel web in contact with rear panel web=2 plies) and a 4-ply portion (front panel web contacts gusset panel web and rear panel web contacts gusset panel web=4 plies). The overseal bar 144 extends across the 2-ply portion and the 4-ply portion to form an overseal having a 2-ply portion and a 4-ply portion. In an embodiment, the overseal bar 144 forms the overseal 64 having 4-ply portion 66 and 2-ply portion 68 as shown in FIG. 8.

In an embodiment, the heat seal apparatus 140 includes suitable thermal and control hardware/software such that the sealing jaw 142 and the overseal bar 144 are heated independently. In this embodiment, the process includes adjusting the overseal bar temperature (the second seal temperature) to a temperature different than the temperature of the sealing jaw(s) (the first seal temperature). In a further embodiment, the process includes adjusting the temperature of the overseal bar 144 to a temperature higher than the first seal temperature—namely, higher than the temperature of the sealing jaws.

In an embodiment, the overseal bar 144 (second seal temperature) has a heat seal temperature from 0° C., or greater than 0° C., or 5° C., or 10° C., or 20° C., or 30° C. or 50° C., to 70° C., or 100° C., or higher than the heat seal temperature of the sealing jaws (the first heat seal temperature).

In an embodiment, the process includes forming the peripheral seals and the overseal simultaneously. The sealing jaws and the overseal bar 144 are components of the same heat seal apparatus. The overseal bar is a component of at least one sealing jaw 142 as shown in FIG. 11. Consequently, two sealing procedures (the peripheral seal procedure and the overseal procedure) are performed at the same heat seal station and at the same time.

In an embodiment, the process includes forming the peripheral seals and the overseal as hard seals. A heat seal can be a frangible seal or a hard seal. A "frangible seal," as used herein, is a heat seal that is manually separable (or peelable) without destruction of the film. A "hard seal," as used herein, is a heat seal that is not manually separable without destruction of the film. In general, a frangible seal is designed to be separable or openable with application of finger pressure or hand pressure to the seal. A hard seal is designed to remain intact with application of finger pressure or hand pressure to the seal. In other words, a hard seal has a peel seal strength that is greater than the tensile strength of the film.

In an embodiment, the overseal bar 144 seals the web sandwich to provide a seal with a seal strength greater than 13N/25.4 mm, or greater than 18N/25.4 mm. Here the seals are tested in accordance with ASTM F88/F88M-09 for 180° peel at 23° C. on INSTRON® tester at 50 mm gap at a rate of 250 mm/min.

In an embodiment, the formation of the flexible container includes forming a flexible container having an apex point and a bottom distalmost inner seal point (BDISP). In a further embodiment, the apex point is apex point 35a (and 35c) and the BDISP is BDISP 37a (and 37c) as described above and shown in FIG. 2 and in FIG. 8. The process includes placing the overseal bar on the web sandwich at a location below the BDISP, or below the apex point. The process further includes forming the overseal 64, with the overseal bar 144, at a location selected from below the BDISP 37a (37c), or below the apex point 35a (35d).

The present process may comprise two or more embodiments disclosed herein.

Definitions

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

An "ethylene-based polymer," as used herein is a polymer that contains more than 50 mole percent polymerized ethylene monomer (based on the total amount of polymerizable monomers) and, optionally, may contain at least one comonomer.

The term "heat seal initiation temperature," is minimum sealing temperature required to form a seal of significant strength, in this case, 2 lb/in (8.8N/25.4 mm). The seal is performed in a Topwave HT tester with 0.5 seconds dwell time at 2.7 bar (40 psi) seal bar pressure. The sealed specimen is tested in an Instron Tensiomer at 10 in/min (4.2 mm/sec or 250 mm/min).

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

Moisture permeability is a normalized calculation performed by first measuring Water Vapor Transmission Rate (WVTR) of the film and then multiplying WVTR by the film thickness (usually thickness in units of mil). WVTR is measured at 38° C., 100% relative humidity and 1 atm pressure with a MOCON Permatran-W 3/31. For values of WVTR at 90% relative humidity the measured WVTR (at 100% relative humidity) is multiplied by 0.90. The instrument is calibrated with National Institute of Standards and Technology certified 25 μm-thick polyester film of known water vapor transport characteristics. The specimens are prepared and the WVTR is performed according to ASTM F1249. WVTR units are $g/m^2/24$ hr.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

Oxygen permeability is a normalized calculation performed by first measuring Oxygen Transmission Rate (OTR) for a given film thickness and then multiplying this measured OTR by the film thickness (usually thickness in units of mil). OTR is measured at 23° C., 50% relative humidity and 1 atm pressure with a MOCON OX-TRAN 2/20. The instrument is calibrated with National Institute of Standards and Technology certified Mylar film of known $O_2$ transport characteristics. The specimens are prepared and the OTR is performed according to ASTM D 3985. Typical OTR units are $cc/m^2/24$ hr/atm.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

Some embodiments of the present disclosure will now be described in detail in the following Examples.

EXAMPLES

1. Materials

TABLE 1a

Composition of the Flexible Multilayer Film - for Example 1 (7 layer co-extruded flexible multilayer film)

| Material | Description | Thickness (micrometers) |
|---|---|---|
| Polyamide | Nylon 6/66 viscosity number 195 cm³/g (ISO 307 @ 0.5% in 96% H₂SO₄), melting point 196° C. (ISO 3146) | 12 |
| Tie Layer | Maleic anhydride grafted polyethylene 0.922 g/cm³; 1.0 MI @ 2.16 Kg 190° C. | 17 |
| Polyethylene | Polyethylene density 0.916 g/cm³; 1.0 MI @ 2.16 Kg 190° C. | 32 |
| Tie Layer | Maleic anhydride grafted polyethylene 0.922 g/cm³; 1.0 MI @ 2.16 Kg 190° C. | 20 |
| Polyamide | Nylon 6/66 viscosity number 195 cm³/g (ISO 307 @0.5% in 96% H₂SO₄), melting point 196° C. (ISO 3146) | 12 |
| Tie Layer | Maleic anhydride grafted polyethylene 0.922 g/cm³; 1.0 MI @ 2.16 Kg 190° C. | 20 |
| Heat Seal Layer* | Ethylene alpha-olefin copolymer 0.899 g/cm³; 1.0 MI @ 2.16 Kg 190° C. | 37 |

*seal layer includes an anti-block agent to facilitate handling of the film during manufacturing of the container.

TABLE 1b

Composition of Baseline Film (5-layer laminated flexible multilayer film, film 1006 available from Smart Bottle, Inc.)

| Material | Description | Thickness (micrometers) |
|---|---|---|
| Polyamide | Nylon 66 viscosity number 260 cm³/g (ISO 307 @ 0.5% in 96% H₂SO₄), melting point 265° C. (ISO 3146) | 18 |
| Lam. Adhesive | Polyurethane Solvent Based Adhesive | 4 |
| Polyethylene | Linear Low Density Polyethylene 0.922 g/cm³; 1.0 MI @ 2.16 Kg 190° C. | 25 |
| Polyethylene | Linear Low Density Polyethylene 0.923 g/cm³; 0.7 MI @ 2.16 Kg 190° C. | 76 |
| Heat Seal Layer | Long chain branched, low density polyethylene 0.916 g/cm³; 1.0 MI @ 2.16 Kg 190° C. | 28 |

Properties for baseline film (comparative) and the Example 1 film are provided in Table 2 below.

TABLE 2

Film Prooerties for Example 1 Film and Baseline Film (comparative)

| Property | Method | Units | Baseline | Example 1 |
|---|---|---|---|---|
| Dart Drop test | ASTM D1709 | g | 1260 | 1500 |
| Puncture resistance | Internal method | J/cm³ | 5.0 +/− 0.2 | 6.6 +/− 0.6 |
| 2% Secant Modulus, machine direction (MD) | ASTM D882 | MPa | 253 +/− 5 | 172 +/12 |
| 2% Secant Modulus, cross direction (CD) | ASTM D882 | MPa | 269 +/− 10 | 180 +/− 15 |
| Film Thickness | ASTM D6988 | Micrometers | 142 +/− 2 | 152 +/− 2 |
| Elmendorf Tear, MD | ASTM D1992 | g | 524 +/− 72 | 5553 +/− 692 |
| Elmendorf Tear, CD | ASTM D1993 | g | 816 +/− 33 | 5471 +/− 979 |
| Tensile Strength MD | ASTM D882 | MPa | 26.3 +/− 1.4 | 31.2 +/− 0.7 |
| Strain at Tensile Strength MD | ASTM D882 | % | 371 +/− 17 | 434 +/− 12 |
| Tensile Strength CD | ASTM D882 | MPa | 26.7 +/− 1.7 | 31.0 +/− 1.3 |
| Strain at tensile Strength CD | ASTM D882 | % | 394 +/− 9 | 468 +/− 9 | g—gram
MPa—megapascal

Flexible containers with a volume of 3.875 L are made using each film—Example 1 and the baseline film. The flexible containers are made under the heat seal conditions provided in Table 3 below. The fabrication equipment is Machine-Model "Bridget" made by KRW Machinery Inc. (Weaverville, N.C.). All seals in the flexible containers are made with one strike.

TABLE 3

Heat Seal Conditions for 0.15 mm Films (Web Sandwich of 0.6 mm, 4 ply)

| Seals | Seal Bar Temperature, ° C. | Platen Pressure, J/cm² | Dwell Time, sec | Overseal protrusion height, mm | Seal Bar Dimensions |
|---|---|---|---|---|---|
| Peripheral | 143 | 258 | 0.75 | 0 | 10 mm × perimeter |
| Overseal | 182 | 258 | 0.75 | 0.30 | 3.2 mm × 25.4 mm (overseal bar, centered about the apex point, W = 3.5 mm) |

The flexible containers have the container geometry as described herein. In particular, each flexible container tested has the bottom geometry as shown in FIG. 2 and FIG. 7 and an overseal shown in FIG. 8. The distance between the apex point and BDISP (i.e., distance S) is varied.

The flexible containers are subjected to the side drop test. The side drop test is performed under the parameters as disclosed herein. The results of the side drop test are shown in Table 4 below.

TABLE 4

| | Inner Seal Distance | 1.5 meter Side Drop Test (min 20 bottles) | |
|---|---|---|---|
| Angle G | between Front Panel BDISP and Apex Point (Distance S) | Example 1 Film % Flexible Containers Passed | Baseline Film % Flexible Containers Passed |
| 45° | 0 | 90% | 30% |
| 45° | 2.63 | 100% | 68% |
| 45° | 3.95 | 100% | 50% |

TABLE 4-continued

| | Inner Seal Distance | 1.5 meter Side Drop Test (min 20 bottles) | |
|---|---|---|---|
| Angle G | between Front Panel BDISP and Apex Point (Distance S) | Example 1 Film % Flexible Containers Passed | Baseline Film % Flexible Containers Passed |
| 45° | 5.26 | 95% | 45% |
| 45° | 7.89 | 60% | 35% |
| 60° | 2.63 | 55% | 32% |

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A process for producing a flexible container comprising:
   A. providing a rear panel web, a front panel web, a first folded gusset panel web, and a second folded gusset panel web, each panel web having peripheral edges and a bottom face, each bottom face having two opposing tapered edges meeting at a bottom end;
   B. placing the folded gusset panel webs between the rear panel web and the front panel web, the gusset panel webs opposing each other, the panel webs configured to form a common periphery and a bottom seal area including the bottom end of each panel;
   C. forming peripheral seals of the flexible container by first sealing the peripheral edges, the tapered edges, and the bottom seal area under a first heat seal condition by cooperatively engaging the webs from opposing sides with two opposing sealing jaws, each sealing jaw having a respective sealing surface, the opposing sealing surfaces imparting a first pressure on the webs;
   D. second sealing at least a portion of the bottom seal area by cooperatively engaging the webs with the two opposing sealing jaws, at least one of the sealing surfaces having an overseal bar that extends away from its respective sealing surface, and imparting, with the overseal bar, a second pressure to the bottom seal area, the second pressure greater than the first pressure;
   E. forming a flexible container; and
   F. forming, with the second pressure of the overseal bar, an overseal in a portion of the bottom seal area.

2. The process of claim 1 wherein the overseal bar has a width and a length, the process comprising forming an overseal having a width and a length corresponding to the width and the length of the overseal bar.

3. The process of claim 2 wherein the second sealing comprises forming a overseal having a 2-ply portion and a 4-ply portion.

4. The process of claim 2 wherein the first heat seal condition includes a respective first seal temperature, the process comprising adjusting the overseal bar temperature to a temperature higher than the first seal temperature.

5. The process of claim 2 wherein the overseal bar has a protrusion height, the process comprising determining the total thickness of the panel webs to be heat sealed; and adjusting the protrusion height to be from 25% to 75% of the total thickness of the panel webs.

6. The process of claim 2 comprising performing the first sealing and the second sealing at the same heat sealing station.

7. The process of claim 2 comprising forming the peripheral seals and the overseal simultaneously.

8. The process of claim 2 comprising forming the peripheral seals and the overseal as hard seals.

9. The process of claim 2 comprising forming a flexible container having an apex point and a bottom distalmost inner seal point (BDISP), wherein the apex point is separated from the BDISP by a distance from greater than 0 mm to 7.9 mm; and
   forming the overseal at a location selected from the group consisting of below the apex point and below the bottom distalmost inner seal point.

10. The process of claim 1 wherein the flexible container also comprises one or more flexible handles.

11. The process of claim 1 comprising forming a flexible container comprising a fitment.

12. The process of claim 1 comprising forming a flexible container comprising a bladder.

13. The process of claim 12 wherein a portion of the bladder is within the overseal.

14. The process of claim 1 comprising forming an overseal having a shape selected from the group consisting of rectangle, square, ellipse, oval, half moon, circle, and pyramid.

15. A process for producing a flexible container comprising:
    A. providing a rear panel web, a front panel web, a first folded gusset panel web, and a second folded gusset panel web, each panel web having peripheral edges and a bottom face, each bottom face having two opposing tapered edges meeting at a bottom end;
    B. forming a web sandwich by placing the folded gusset panel webs between the rear panel web and the front panel web, the gusset panel webs opposing each other, the panel webs configured to form a common periphery and a bottom seal area including the bottom end of each panel;
    C. providing two opposing sealing surfaces, at least one sealing surface having an overseal bar, the overseal bar extending away from its respective sealing surface;
    D. placing the web sandwich between the opposing sealing surfaces;
    E. cooperatively engaging the web sandwich with the opposing sealing surfaces;
    F. forming peripheral seals by sealing the peripheral edges, the tapered edges, and the bottom seal area with the sealing surfaces;
    G. imparting, with the overseal bar, an overseal in a portion of the bottom seal area.

16. The process of claim 15 comprising forming a flexible container having an apex point and a bottom distalmost inner seal point (BDISP), wherein the apex point is separated from the BDISP by a distance from greater than 0 mm to 7.9 mm; and
    forming the overseal at a location selected from the group consisting of below the apex point and below the bottom distalmost inner seal point.

17. The process of claim 16 wherein the overseal bar has a protrusion height, the process comprising determining the total thickness of the panel webs to be heat sealed; and adjusting the protrusion height to be from 25% to 75% of the total thickness of the panel webs.

18. The process of claim 17 comprising
    imparting a first pressure on the webs with the opposing sealing surfaces to form the peripheral seals, peripheral tapered seals, and the bottom seal area; and imparting, with the overseal bar, a second pressure to the bottom seal area, the second pressure greater than the first pressure.

19. The process of claim 18 comprising forming the peripheral seals and the overseal simultaneously and forming the overseal where the peripheral seals converge.

20. The process of claim 19 comprising second sealing at a temperature from 5° C. to 100° C. higher than a first sealing temperature.

* * * * *